(12) United States Patent
Veltkamp

(10) Patent No.: US 8,516,698 B2
(45) Date of Patent: Aug. 27, 2013

(54) METHOD AND DEVICE FOR MANUFACTURING A HEAT EXCHANGER

(75) Inventor: Wessel Bart Veltkamp, Son (NL)

(73) Assignee: Level Holding B.V. (NL)

( * ) Notice: Subject to any disclaimer, the term of this patent is extended or adjusted under 35 U.S.C. 154(b) by 1020 days.

(21) Appl. No.: 11/584,003

(22) Filed: Oct. 20, 2006

(65) Prior Publication Data

US 2007/0107221 A1    May 17, 2007

(30) Foreign Application Priority Data

Oct. 26, 2005   (NL) .................................... 1030270

(51) Int. Cl.
  *F28F 3/10*  (2006.01)
(52) U.S. Cl.
  USPC .................... 29/890.03; 29/890.039
(58) Field of Classification Search
  USPC ............... 29/890.03, 890.039, 890.041, 430, 29/431, 890.054, 429
  See application file for complete search history.

(56) References Cited

U.S. PATENT DOCUMENTS

| | | | | |
|---|---|---|---|---|
| 4,099,928 | A * | 7/1978 | Norback | 29/890.039 |
| 4,116,271 | A | 9/1978 | De Lepeleire | |
| 4,783,904 | A * | 11/1988 | Kimura | 29/786 |
| 6,811,071 | B2 * | 11/2004 | Caspar et al. | 228/182 |
| 2006/0242831 | A1 * | 11/2006 | Cesaroni | 29/890.054 |

FOREIGN PATENT DOCUMENTS

| | | |
|---|---|---|
| CN | 1121582 | 5/1996 |
| CN | 1352585 | 6/2002 |
| DE | 33 30 254 | 3/1985 |
| EP | 0 0208 042 | 1/1987 |
| EP | 208042 A * | 1/1987 |
| EP | 0 844 454 | 5/1998 |
| EP | 1 191 297 | 3/2002 |
| WO | WO 97/02461 | 1/1997 |

OTHER PUBLICATIONS

Dutch Search Report, NL 1030270, dated Jun. 27, 2006.
Office Action for corresponding Chinese Patent Application 2006100642189.
European Search Report for corresponding European Patent Application 06 12 2663 dated Dec. 15, 2010.
Office Action for corresponding Indian Patent Application 2327/DEL/2006 dated Dec. 14, 2010.

* cited by examiner

*Primary Examiner* — David P. Bryant
*Assistant Examiner* — Christopher Besler
(74) *Attorney, Agent, or Firm* — Banner & Witcoff, Ltd.

(57) ABSTRACT

The invention relates to a method and a device for manufacturing a heat exchanger assembled from substantially flat elements provided with spacing profiles, wherein adjacent elements are provided on at least a part of their edges with spacing profiles, and wherein the method comprises of stacking the substantially flat elements onto each other until the required height is obtained, and mutually connecting the substantially flat elements at the edges of the elements, wherein the elements are connected by bringing only the side surfaces of the stack of elements into contact with a liquid forming a connection between the elements. This measure makes automated processing possible. The stack of elements is preferably immersed to a limited depth in a bath of the liquid forming a connection between the elements. The method is hereby easy to control, while the means necessary for performing thereof are relatively simple.

7 Claims, 4 Drawing Sheets

METHOD AND DEVICE FOR MANUFACTURING A HEAT EXCHANGER

This application claims the priority of NL Patent Application No. 1030270, filed Oct. 26, 2005. This application is incorporated herein by reference in its entirety.

The present invention relates to a method for manufacturing a heat exchanger assembled from substantially flat elements provided with spacing profiles, wherein adjacent elements are provided on at least a part of their edges with spacing profiles and wherein the method comprises of stacking the substantially flat elements onto each other until the required height is obtained and mutually connecting the substantially flat elements at the edges of the elements.

Such a method is known. This method relates to the manufacturing of heat exchangers as are described in WO-A-9702461. Such heat exchangers are manufactured by hand. Because of an increasing demand for such heat exchangers, there is a need for a more automated method of manufacturing such heat exchangers, so that the cost price of the heat exchangers can be reduced.

The present invention provides for this purpose the measure that the elements are connected by bringing only the side surfaces of the stack of elements into contact with a liquid forming a connection between the elements.

This measure makes automated processing possible.

The advantages of this method are also obtained with a device for manufacturing a heat exchanger assembled from substantially flat elements provided with spacing profiles, wherein adjacent elements are provided on at least a part of their edges with spacing profiles, wherein the device is provided with a stacking member for stacking the substantially flat elements onto each other and with connecting means for mutually connecting the substantially flat elements at the edges of the elements, wherein the connecting means are adapted to bring only the side surfaces of the stack of elements into contact with a liquid forming a connection between the elements.

There are various possibilities for bringing the stack of elements into contact with a liquid; the liquid can for instance be sprayed onto the sides of the stack of elements. A preferred embodiment however provides the measure that the stack of elements is immersed to a limited depth in a bath of the liquid forming a connection between the elements This measure makes the method easy to control, while the means necessary for performing thereof are relatively simple.

These advantages are likewise obtained with a device wherein the connecting means comprise a rotatable gripping member which is adapted to grip the stack of elements on its end surfaces, and which is adapted to successively hold the stack of elements with a side surface of the stack of elements in horizontal position, wherein the gripping member is adapted to immerse the bottom side surface of the stack of elements in a vessel of connecting liquid.

Yet another embodiment provides the measure that the gripping member is adapted to carry out a vertical movement. The immersion process requires the contact between the liquid and the material for immersion; although it is possible to hold the material for immersion and to move the container for the liquid upward, it is recommended from a structural viewpoint that the gripping member is adapted to carry out a vertical movement. The vessel is here held still.

A further attractive embodiment results when the vessel is provided with a movable cover which is only removed during immersion. This is particularly attractive when the liquid is formed by a evaporable solvent in respect of preventing excessive evaporation of the liquid.

The immersion process can be varied in depth and duration. The components to be mutually connected, i.e. the profiles on the edges of the elements which contact the adjacent elements, have a certain dimension in the direction of immersion. It is of course possible to immerse the stack of elements to this depth. It is however attractive to immerse the stack of elements to a lesser depth and, for transport of the liquid to the rest of the surface, to make use of capillary effects between the surfaces for connecting.

The form of the heat exchanger provided here is a six-sided prism, i.e. a body with two inlet surfaces, two outlet surfaces, two closed surfaces and two end surfaces. To obtain an efficiently operating heat exchanger it is important that all sides of the prism-shaped heat exchanger come into contact with the liquid, since elements which must be connected to each other are incorporated in all sides. A further preferred embodiment therefore provides the measure that the substantially flat elements are hexagonal and that each of the six sides of the stack of elements is immersed into the liquid. With a specific design of the elements it is possible that two sides lie pairwise in line with each other; a four-sided shape is then created.

This can be achieved structurally in that the gripping means are provided with plates which grip the end walls of the stack of elements and which are provided with a profile which is form-fitting on the top and bottom element of the stack. The immersion process is after all not impeded hereby, while the stack of elements is held sufficiently firmly. It is pointed out here that, prior to immersion, the elements are only stacked and so do not yet have any mutual adhesion, so that it is important that the elements are pressed together such that the stack is form-retaining.

In order to remove excess liquid by draining it is attractive that, between immersion of each of the sides, the stack of elements is held still with an edge between two side surfaces in downward direction.

The invention requires the availability of a liquid which performs such an adhesive function on the elements. In the embodiment provided here use is made of panels manufactured from plastic. In a large number of plastics, such as polypropylene, polystyrene, polycarbonate, polyvinyl chloride or polyethylene terephthalate, glue connections can be used to form a connection between the spacing profiles. A glue is here understood to mean a material which leaves a detectable residue. In some materials the elements must be subjected to a pretreatment to obtain a durable adhesion between the elements and the glue.

It is however also possible for the elements to be mutually connected by a liquid which dissolves the material. It must of course be ensured here that the solvent is not so aggressive that the edges of the elements are wholly deformed or even dissolve completely and thereby disappear, but that the solvent functions such that the material softens at its surface and takes on a form in which it can fuse with the adjacent element. It has been found by the inventor that a combination of elements manufactured from polystyrene and the solvent cyclohexane produces good results.

The invention is however not limited to the application of the above mentioned liquids; it is also possible to make use of a liquid which only acquires its adhesive action in a subsequent process, such as a soldered connection. A preferred embodiment provides such a method for this purpose, wherein the liquid is formed by a liquid comprising solder and the heat exchanger is subjected after immersion to a heating to a temperature exceeding the melting temperature of the solder. A solder is herein made liquid, for instance by adding a solvent. After applying the solder in an immersion process the solvent dissolves, whereafter the solder remains. In the subsequent process, which is formed by a heating process, the solder melts and a mechanical connection is formed. Such a process is also known as a 'reflow' soldering process. It will be apparent that such a process can only be applied in the case of solderable materials such as metals or ceramics.

As can be inferred from WO-A-9702461, the heat exchangers are assembled from substantially flat elements which are stacked onto each other and provided with profiles for performing the heat exchanger function, but which are also provided with profiles for holding the elements at a mutual distance. It has been found by the inventor that the construction can be simplified by making use of elements of the first type, which are provided with profiles for the heat exchanger function and with profiles for holding the heat exchanger at a distance from the elements and sealing it, and with elements of the second type which are substantially flat but which are provided with profiles for holding the heat exchanger at a distance from the elements and sealing it. The elements of the first type and of the second type are herein stacked alternately.

The method comprises of a stacking process for the substantially flat elements. In order to correct as soon as possible inaccuracies in the horizontal position during stacking, the stacked elements are subjected to a horizontal force positioning the elements each time a new element has been placed.

Such a process is preferably carried out by a stack holder which is provided with at least one side wall which is movable in substantially horizontal direction and which is adapted to take up a position away from the centre of the stack when an element is placed, and to take up a position toward the centre of the stack after an element has been placed.

Another preferred embodiment provides the measure that the elements are gripped by a stacking member and are stacked, that the stacking member performs a cyclical movement successively past a container for elements of the first type, a container for elements of the second type and a collecting container, and that the stacking member moves an element of the first type past the container for elements of the second type. A single stacking member can hereby suffice, which must however be embodied for the purpose of gripping more than one element. The single stacking member has the advantage that only a single moving body need be controlled and driven.

It is otherwise also possible to make use of a stacking machine wherein two stacking members are applied. A first stacking member is used here for placing the elements of the first type and a second stacking member is used for placing the elements of the second type. The stacking members are herein controlled such that they place elements alternately.

The same advantages are obtained when the stacking device comprises a container for elements of the first type, a container for elements of the second type and a collecting container, in addition to a stacking member for elements which is provided with at least one gripping position and which is adapted to carry out a cyclical movement past the container for the elements of the first type, the container for the elements of the second type and the collecting container, and when the stacking member is adapted to transport the elements of the first type past the container of the elements of the second type.

The construction of the stacking device is simplified when the stacking member comprises a rotatable element which is provided with six gripping positions. A rotatable stacking member moreover has the advantage that the device is not subjected to many dynamic loads.

According to yet another embodiment, the elements are each manufactured by a thermoforming process. Although other methods of manufacturing the elements, such as injection moulding and hydroforming, are in principle possible, the inventor has found that quicker and therefore cheaper results can be achieved with the thermoforming process. This is counter to expectation, since the starting foil of the elements is extremely thin and a skilled person would not expect that the end product could be realized with an accuracy of 0.1 mm in the forming over the whole surface.

These favourable results in the thermoforming process are obtained largely because at least the elements of one of the types are manufactured by means of a thermoforming process with a porous mould. Particularly the elements of the first type, in which the oblique walls of the channels must be arranged, are quite critical. The material of the elements is hereby subjected to a great elongation, which could quickly result in the forming of openings. This probability is reduced by applying the porous mould and the associated uniform suction over the entire mould.

The invention will now be elucidated with reference to the accompanying figures, in which.

As already elucidated in the foregoing, the method according to the invention makes use of a device provided with a stacking device for stacking the elements from which the heat exchanger for manufacturing is constructed. The type of heat exchanger to which the invention relates is particularly assembled from substantially flat elements of different types which are stacked alternately. The stacking device is therefore adapted for alternate stacking of elements of the first type and of the second type.

Figure 1:
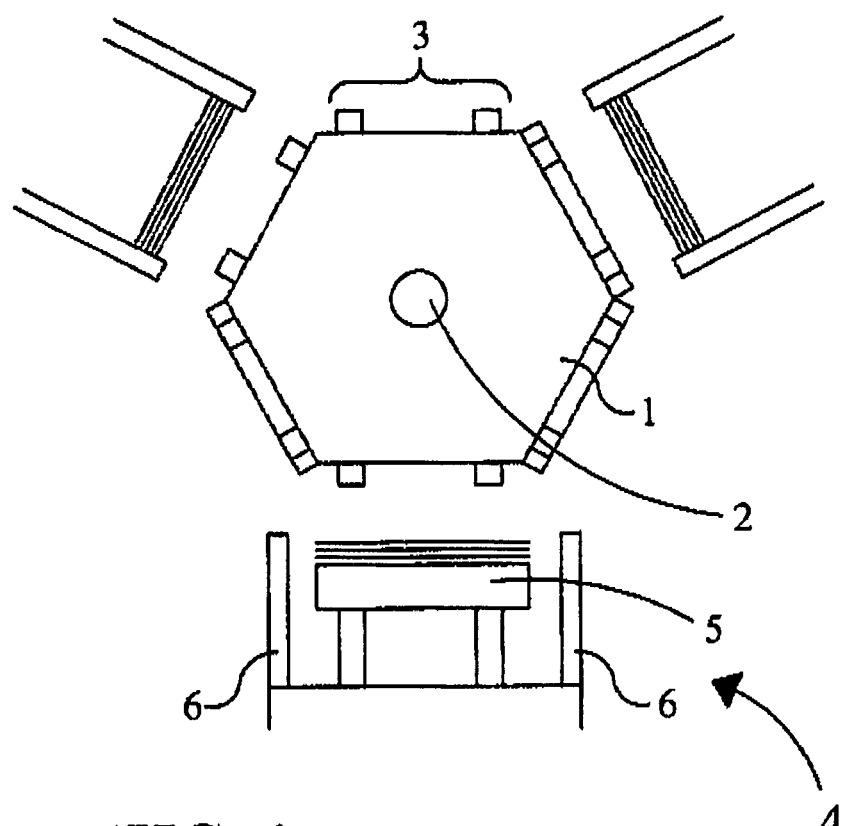
FIG. 1 is a schematic view of a stacking device according to the invention.

For this purpose the device shown in FIG. 1 comprises a stacking member 1 with a hexagonal section. Stacking member 1 can be driven rotatably about a central shaft 2. Stacking member 1 is provided on each of its six side surfaces with a gripping member in the form of vacuum suction members 3, which are shown schematically in the drawing and which are connected to control members not shown in the drawing. Shaft 2 is connected to a drive member (not shown), such as a stepping motor for moving stacking member 1 between each of the six positions. Placed under stacking member 1 is a collecting holder 4 for collecting the elements forming a stack. Collecting holder 4 comprises a height-controllable table 5 which is controlled such that stacking member 1 always places the elements for placing at roughly the same height. Because stacking member 1 is adapted to stack the hexagonal elements, the collecting holder 4 is provided with six side walls 6, at least one of which is movable in horizontal direction.

For supply of the elements for stacking the stacking device is provided with a first holder 7 for elements 10 of the first type and with a second holder 8 for elements 11 of the second type. The axis of the two holders 7, 8 extends at an angle of 60° to the vertical. Owing to this positioning a gripping member 3 of stacking member 1 can be moved under each of the holders 7, 8, wherein the elements 10,11 for gripping can be gripped by gripping members 3 with a simple, linear movement.

Figure 2A:
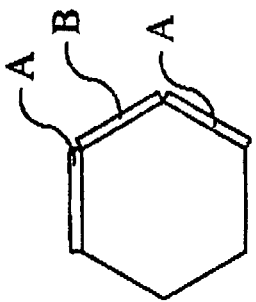
FIGS. 2A-2F are schematic views of the stacking device shown in FIG. 1 at various stages of the stacking process.
Figure 2B:
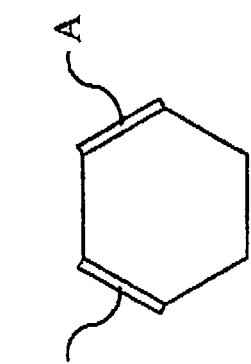
Figure 2C:
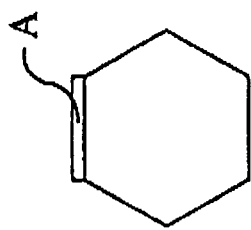
Figure 2D:
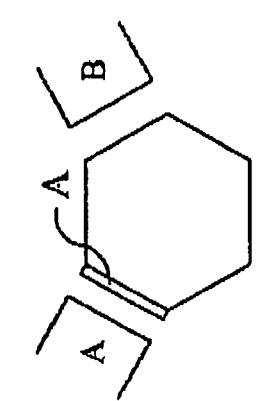
Figure 2E:
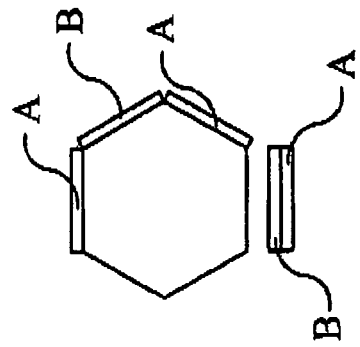
Figure 2F:
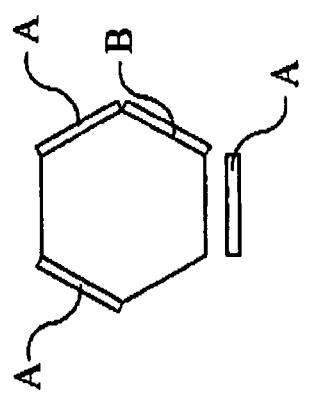

The operation of each of the stacking devices will now be elucidated, partly with reference to FIGS. 2A-2F. Taken as starting point here is the situation in which the heat exchanger must be formed with an element of the first type 10 at the top and bottom of the stack. The stacking process thus begins with the gripping of an element of the first type 10 from holder 7, as shown in FIG. 2A. Stacking member 1 then rotates further through an angle of 60° so that the position shown in FIG. 2B is obtained. Then follows further rotation through an angle of 60°, whereafter the gripping member then located under first holder 7 grips an element of the first type 10. The gripping member already provided with an element of the first type 10 is here situated under second holder 8, as shown in FIG. 2C. After yet another rotation an empty gripping member is located under second holder 8 and the relevant gripping member grips an element of the second type 11. The situation shown in FIG. 2D is then obtained. A gripping member is here also situated under first holder 7, but no gripping operation takes place there. After further rotation through 60° the situation shown in FIG. 2E is obtained. The gripping member provided with the element of the first type 10 releases the element and places the element on table 5 of collecting holder 4. An element of the first type 10 is simultaneously gripped from first holder 7 by the gripping member situated under first holder 10. Following another rotation through an angle of 60° the position shown in FIG. 2F is obtained. An element of the second type 11 is herein placed on table 5 and an element of the second type 11 is gripped. After a repeated rotation through 60° the situation shown in FIG. 2E is obtained once again. Elements of the first type 10 and the second type 11 are thus stacked alternately. The process is repeated until the stack of elements 10, 11, . . . has reached the required height in collecting holder 4. Stack 10, 11, . . . is closed here with an element of the first type 10.

In order to avoid leakage between the two airflows travelling through the heat exchanger and in order to properly carry out the glueing process to be performed after the stacking, it is important that elements 10, 11 are positioned well relative to each other.

For this purpose collecting holder 4 comprises three side walls which are placed in accordance with the two inlet surfaces, the two outlet surfaces and the two closed side surfaces of the heat exchanger. One of these walls is formed by a side wall 6 movable in at least substantially horizontal direction. During placing of elements 10,11 side wall 6 is moved to its outermost position so as to facilitate placing, even when element 10,11 has a position on stacking member 1 which is not wholly correct. After placing, the side wall 6 is moved to its innermost position in order to move the placed elements 10,11 to the correct position.

After the completion of a stack, the stack of elements 10,11, . . . is gripped on both its end surfaces by immersion means in the form of two plates 20 and 21. On their side coming into contact with elements 10 these plates are provided with a profile which has a degree of form-fitting with elements 10. Plates 20 and 21 pick up the stack and carry it to a position above an immersion vessel 22, which is filled with a liquid forming a connection between the elements. Vessel 22 can be closed with a slidable cover 23. After reaching the position above vessel 22 the assembly of plates 20,21 and the stack of elements 10,11, . . . present therebetween is rotated until a position is reached in which the axis of the stack of elements extends horizontally.

Figure 3:
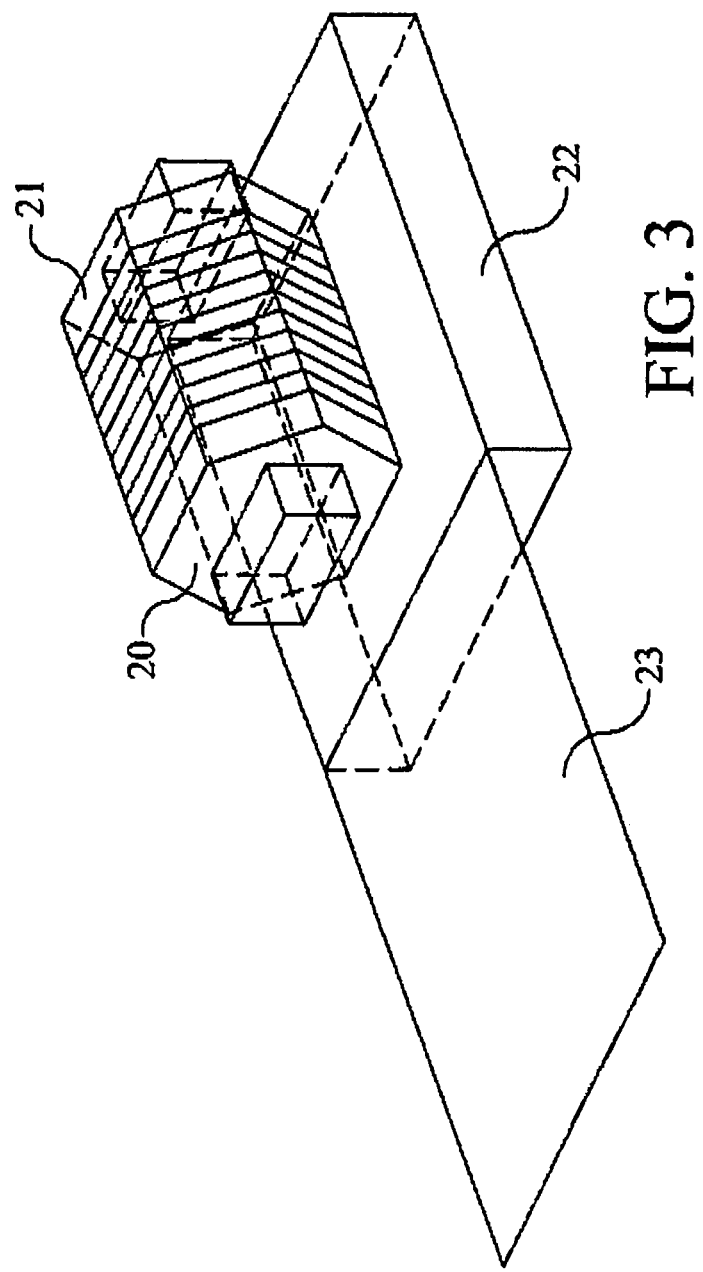
FIG. 3 is a perspective view of an immersion device according to the invention.

The situation which is shown in FIG. 3 is then reached. Cover 23 of vessel 22 is then opened and the stack of elements 10,11 is immersed in the liquid until the bottom surface of the stack is situated a short distance below the liquid level. The liquid is then able to penetrate between plates 10,11. The parts of the surfaces for connecting are fully wetted here. Immediately after reaching the above described position the assembly of the plates and the stack of elements is once again moved above the liquid level. The excess liquid can then drain out of the stack of elements. This draining process is enhanced by rotating the stack of elements to a position in which an edge between two side surfaces is situated in a low position. The stack is then rotated further until a subsequent side surface of the stack of elements is in the lowest horizontal position, and the immersion process is repeated. This process is repeated for all side surfaces of the stack of elements. The stack of elements is then rotated again by plates 20, 21 through an angle of 90 degrees so that elements 10,11 once again extend horizontally. The stack of elements is then placed on a belt to allow evaporation of the adhering liquid, such as the solvent. The partly dissolved plates 10,11 are hereby connected to each other.

Figure 4:
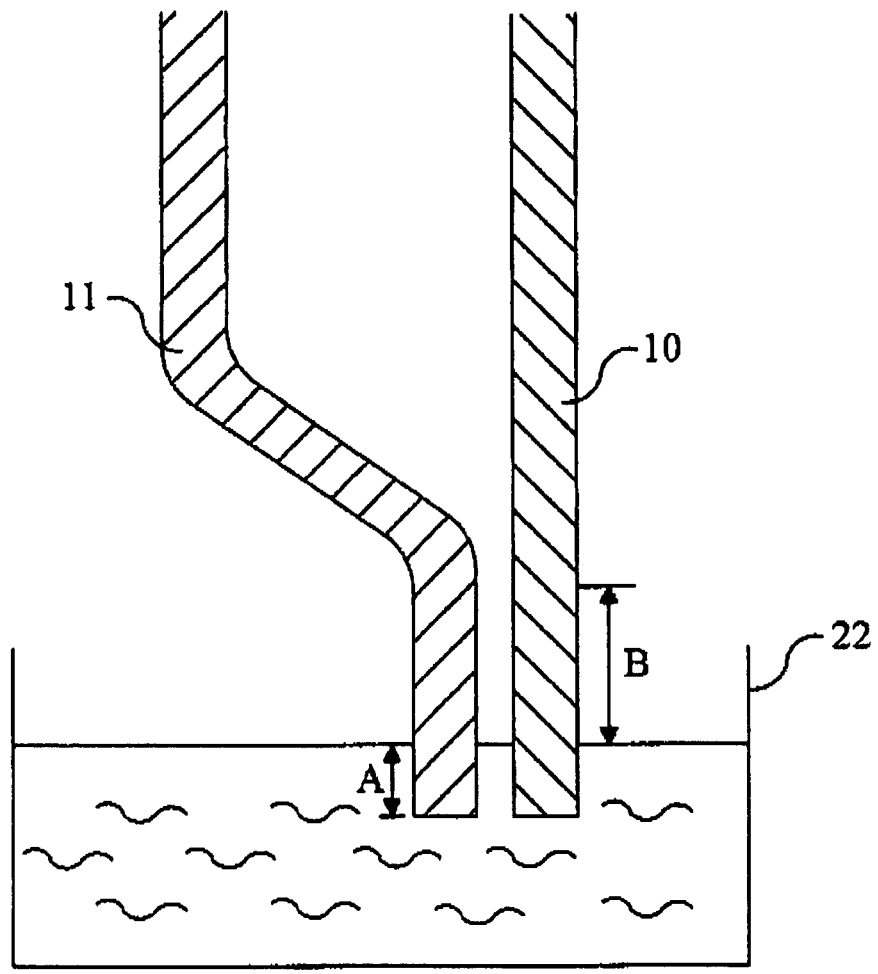
FIG. 4 is a detailed cross-sectional view of two elements during the immersion process.

FIG. 4 shows the situation during immersion. This shows that the elements are only immersed in the liquid to a depth A. As a result of the capillary action of the liquid and the pressed-together parts of elements 10,11 the liquid moves upward to a height B above the liquid. It is essential for this purpose that the surface of the elements has a certain roughness and that the elements are situated so close together that the capillary effect functions. The advantage hereof is that immersion can be less deep and shorter, and that the surfaces for connecting are fully wetted.

The liquid exerts an adhesive force on the elements situated at a short distance from each other. Since the adhesive force between the surfaces for connecting is inversely proportional to the distance between the surfaces, this method can only be applied when the initial distance between surfaces does not exceed at any location the value at which the resilience of the material exceeds the adhesive forces. For most plastics and connecting means the maximum distance is in the order of 0.1 mm, which makes high demands of the process of forming the elements. These elements, or at least those parts thereof which must be adhered to each other, will hereby move toward each other. This effect compensates any tolerances in the manufactured elements.

The invention claimed is:

1. Method for manufacturing a heat exchanger assembled from substantially flat elements of a first kind having edges and substantially flat elements of a second kind having edges, wherein the substantially flat elements of the second kind are provided with spacing profiles extending along at least part of their edges, and wherein the method comprises the following steps:

stacking alternating substantially flat elements of the first kind and of the second kind onto each other until a stack of the elements with the required height is obtained wherein the spacing profiles of the substantially flat elements of the second kind are in contact with the adjacent substantially flat elements of the first kind;

mutually connecting the substantially flat elements at the edges of the elements by immersing a first side surface of the stack of the elements into a liquid forming a connection between the elements over a depth which is smaller than the width of the spacing profiles, wherein the liquid is a solvent which partially dissolves the flat plates; and removing the stack of elements from the liquid;

wherein the elements in the stack of the elements being situated close enough together such that when the elements contact the liquid a capillary effect occurs and the liquid travels between adjacent elements over the width of the spacing profiles to form a connection between adjacent elements; and rotating the stack of elements, dipping a further side surface into the solvent liquid, removing said further side surface from the liquid, and repeating the dipping and removing for the remaining side surfaces of the stack of elements.

2. Method as claimed in claim 1, characterized in that the substantially flat elements are hexagonal and that each of the six side surfaces of the stack of elements is immersed into the liquid.

3. Method as claimed in claim 2, characterized in that between immersion of each of the side surfaces the stack of elements is held still with an edge between two side surfaces in downward direction.

4. Method as claimed in claim 1, characterized in that the stack of stacked elements are subjected to a horizontal force positioning the elements each time a new element has been placed.

5. Method as claimed in claim 1, characterized in that the elements are gripped by a stacking member and are stacked, that the stacking member performs a cyclical movement successively past a container for elements of the first kind, a container for elements of the second kind and a collecting container for the elements, and that the stacking member moves an element of the first kind past the container for elements of the second kind.

6. Method as claimed in claim 1, characterized in that the elements are each manufactured by a thermoforming process.

7. Method as claimed in claim 6, characterized in that at least the elements of one of the first and second kinds are manufactured by means of a thermoforming process with a porous mould.

* * * * *